(12) United States Patent
Yackman

(10) Patent No.: US 6,592,447 B1
(45) Date of Patent: Jul. 15, 2003

(54) VENTILATION SYSTEM FOR A VEHICLE INTERIOR

(76) Inventor: Paul Yackman, 20- Davidson Mill Rd., South Brunswick, NJ (US) 08902

( * ) Notice: Subject to any disclaimer, the term of this patent is extended or adjusted under 35 U.S.C. 154(b) by 0 days.

(21) Appl. No.: 10/156,088

(22) Filed: May 28, 2002

(51) Int. Cl.⁷ .................................................. B60H 1/26
(52) U.S. Cl. ....................................... 454/162; 454/165
(58) Field of Search ................................ 454/137, 162, 454/163, 164, 165

(56) References Cited

U.S. PATENT DOCUMENTS 1,676,269 A * 7/1928 Lutz ............................. 454/163
5,261,855 A * 11/1993 Law et al. ..................... 454/76
5,733,190 A * 3/1998 Wahab ......................... 454/164

FOREIGN PATENT DOCUMENTS

DE 35 33 069 * 3/1987 .................. 454/162
JP 11-286216 * 10/1999

* cited by examiner

Primary Examiner—Harold Joyce

(57) ABSTRACT

A ventilation system for a vehicle interior that reduces or eliminates smoke or polluted air from an interior of a vehicle by pulling air with fans through air intakes and expelling it outside vehicle. This invention is wired to a vehicle's electrical system and controlled by an on/off switch inside vehicle. Clean air inside a vehicle is beneficial in reducing health risks associated with breathing smoke or polluted air. The present invention also prevents deterioration of a vehicle's interior by reducing or eliminating smoke or polluted air that stains and causes odors to vehicle interiors.

14 Claims, 4 Drawing Sheets

VENTILATION SYSTEM FOR A VEHICLE INTERIOR

BACKGROUND OF THE INVENTION

1. Field of the Invention

The present invention relates to a ventilation system for a vehicle interior for use in connection with passenger cars wherein a driver and/or a passenger smoke, to pull smoke-filled air from an interior of a vehicle and expel it outside the automobile. The ventilation system for a vehicle interior has particular utility in connection with reducing or eliminating second-hand smoke from an interior of a vehicle.

2. Description of the Prior Art

Ventilation systems for a vehicle interior are desirable to circulate air inside a vehicle.

The use of a ventilation system for a vehicle interior is known in the prior art. For example, U.S. Pat. No. 5,296,678 to Schnorf discloses a fan system located on a conventional sum visor of a vehicle for heating and defrosting or defogging the vehicle windshield. However, the Schnorf '678 patent does not reduce or eliminate smoke from an interior of a vehicle, and has further drawbacks of recirculating low quality air inside a vehicle.

U.S. Pat. No. 5,261,855 to Law, et al discloses a smoke removal system for vehicles that includes exit vents near passengers to remove secondhand smoke from a passenger compartment. However, the Law, et al '855 patent does not ventilate air to reduce or eliminate secondhand smoke from an interior of a vehicle, and additionally does not work with a vehicle's electrical system to pull smoke-filled air from a vehicle interior, expelling it outside the automobile.

Similarly, U.S. Pat. No. 5,733,190 to Wahab discloses an apparatus to reduce harmful effects of environmental tobacco smoke inside a vehicle that includes a transparent plastic curtain to divide a vehicle interior separating smokers from non-smokers, an electric exhaust fan near smokers, and a tube from exhaust end of fan leading outside the vehicle. However, the Wahab '190 patent does not allow smokers and non-smokers to sit together inside the vehicle, and can not be operated without intrusion to its users due to a cumbersome partitioning feature involved.

Lastly, U.S. Pat. No. 4,062,273 to O'Connor discloses a ventilation system for a passenger vehicle, specifically for a rapid transit vehicle that procures a uniform air flow and exchange of air in a passenger compartment of a vehicle. However, the O'Connor '273 patent does not specifically relate to a vehicle interior, and has the additional deficiency of requiring reconstruction of a traditional passenger compartment.

While the above-described devices fulfill their respective, particular objectives and requirements, the aforementioned patents do not describe a ventilation system for a vehicle interior that allows the reduction or elimination of second-hand smoke from an interior of a vehicle. The O'Connor patent makes no provision for reducing or eliminating smoke or polluted air from an interior of a vehicle and expelling it outside a vehicle.

Therefore, a need exists for a new and improved ventilation system for a vehicle interior that can be used for the reduction or elimination of second-hand smoke from an interior of a vehicle. In this regard, the present invention substantially fulfills this need. In this respect, the ventilation system for a vehicle interior according to the present invention substantially departs from the conventional concepts and designs of the prior art, and in doing so provides an apparatus primarily developed for the purpose of reducing or eliminating second-hand smoke from an interior of a vehicle.

SUMMARY OF THE INVENTION

In view of the foregoing disadvantages inherent in the known types of ventilation systems for a vehicle interior now present in the prior art, the present invention provides an improved ventilation system for a vehicle interior, and overcomes the above-mentioned disadvantages and drawbacks of the prior art. As such, the general purpose of the present invention, which will be described subsequently in greater detail, is to provide a new and improved ventilation system for a vehicle interior that reduces or eliminates second-hand smoke from an interior of a vehicle which has all the advantages of the prior art mentioned heretofore and many novel features that result in a ventilation system for a vehicle interior which is not anticipated, rendered obvious, suggested, or even implied by the prior art, either alone or in any combination thereof.

To attain this, the present invention essentially comprises a ventilation system for a vehicle interior with exhaust fan units made up of small, quiet, powerful fans, air intake vents, and exhaust hoses. The exhaust fan units are near a motor, which is connected to a vehicle's electrical wiring system and an on/off switch in interior of vehicle. Exhaust hoses lead smoke or polluted air outside a vehicle.

There has thus been outlined, rather broadly, the more important features of the invention in order that the detailed description thereof that follows may be better understood and in order that the present contribution to the art may be better appreciated.

The invention may also include exhaust fan units located at front an rear of a vehicle interior. There are, of course, additional features of the invention that will be described hereinafter and which will form the subject matter of the claims attached.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved ventilation system for a vehicle interior that has all of the advantages of the prior art ventilation systems for a vehicle interior and none of the disadvantages.

It is another object of the present invention to provide a new and improved ventilation system for a vehicle interior that may be easily and efficiently manufactured and marketed.

An even further object of the present invention is to provide a new and improved ventilation system for a vehicle interior that has a low cost of manufacture with regard to both materials and labor, and which accordingly is then susceptible of low prices of sale to the consuming public, thereby making such ventilation system for a vehicle interior economically available to the buying public.

Still another object of the present invention is to provide a new ventilation system for a vehicle interior that provides in the apparatuses and methods of the prior art some of the advantages thereof, while simultaneously overcoming some of the disadvantages normally associated therewith.

Even still another object of the present invention is to provide a ventilation system for a vehicle interior for reducing or eliminating second-hand smoke from an interior of a vehicle. This allows a user a cleaner, safer vehicle interior.

Lastly, it is an object of the present invention to provide a new and improved method of removing smoke or polluted air from an interior of a vehicle and expelling it outside a vehicle.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DESCRIPTION OF THE PREFERRED EMBODIMENT

Figure 1:
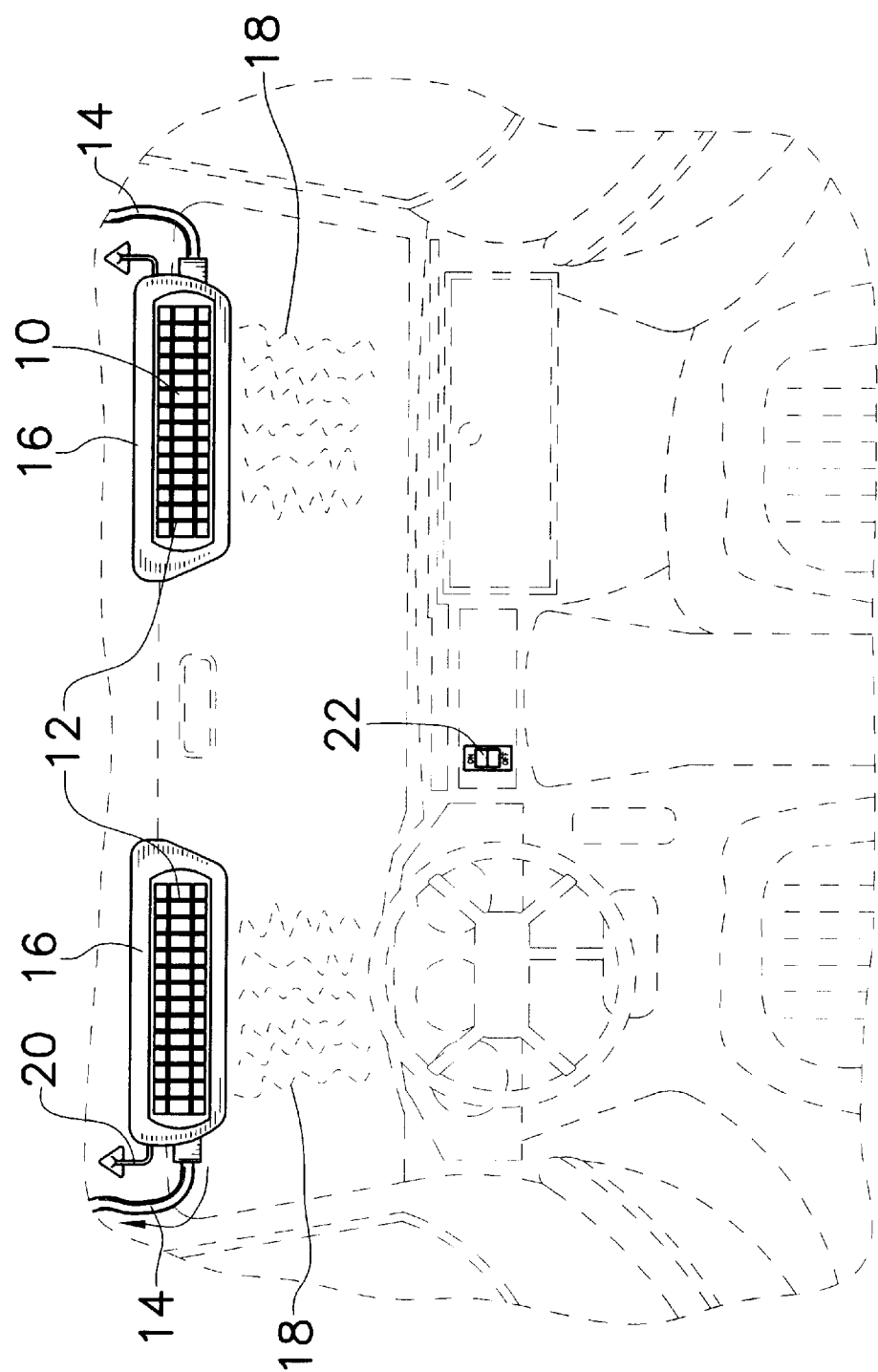
FIG. 1 is a plan view of the preferred embodiment of the ventilation system for a vehicle interior constructed in accordance with the principles of the present invention.

Referring now to the drawings, and particularly to FIGS. 1–5, a preferred embodiment of the ventilation system for a vehicle interior of the present invention is shown and generally designated by the reference numeral 10.

In FIG. 1, a new and improved ventilation system for a vehicle interior 10 of the present invention for reducing or eliminating second-hand smoke from an interior of a vehicle is illustrated and will be described. More particularly, the ventilation system for a vehicle interior 10 comprises exhaust fan units which have air intake vents 12 and exhaust hoses 14 attachable to a sun visor 16 of a vehicle interior. FIG. 1 shows placement of a hinge 20 on each side of a sun visor 16. The intake vents 12 pull smoke 18 or polluted air from a vehicle interior and release it outside a vehicle through exhaust hoses 14. The exhaust fan units can be powered by battery or a vehicle's electrical system and are operated by an on/off switch 22 inside a vehicle interior. A battery system can be attached to and located within exhaust fan unit. Exhaust fan units can be either permanently attached or temporarily attached to a vehicle interior.

Figure 2:
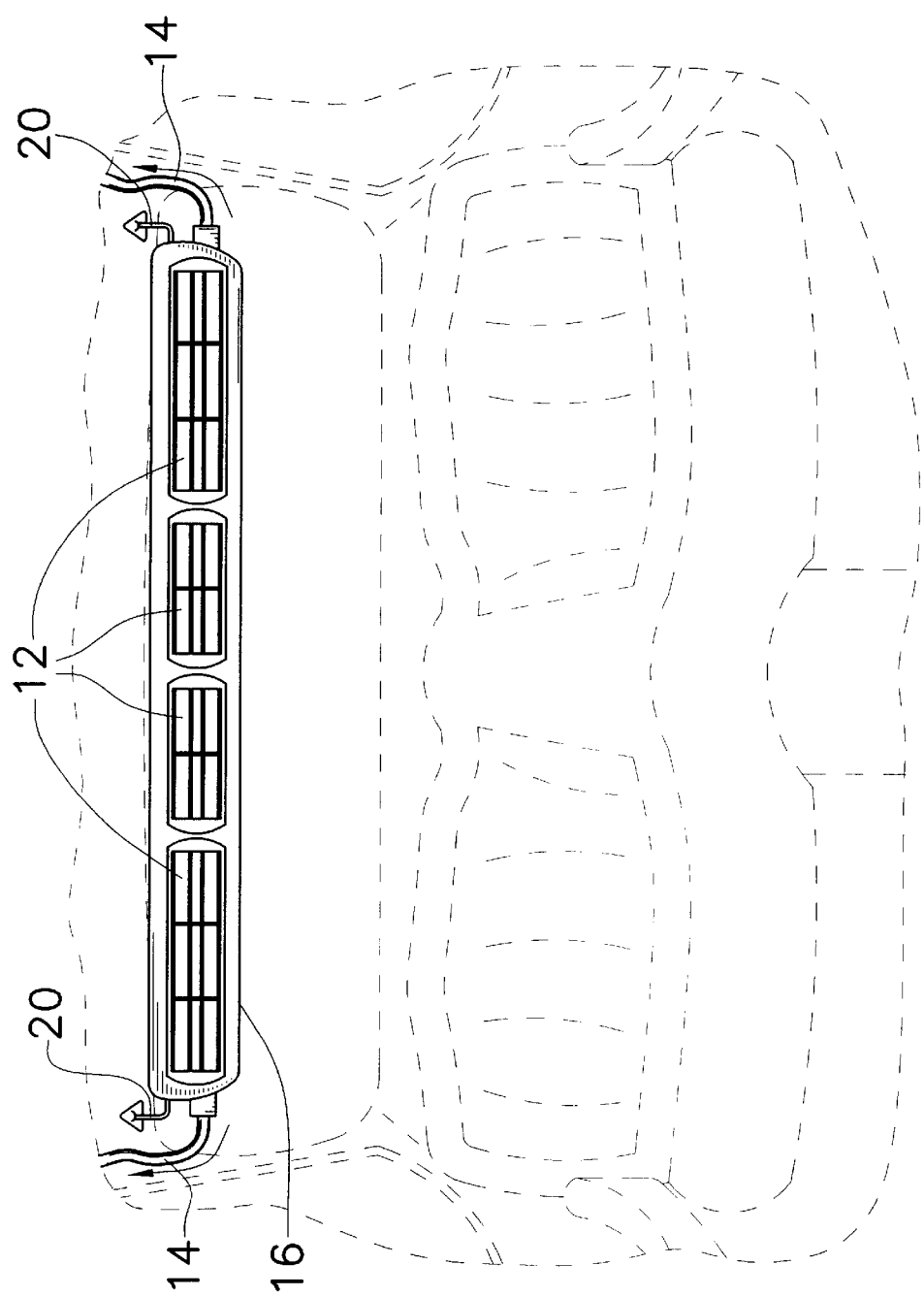
FIG. 2 is a partial plan view of intake vents and exhaust hoses of the ventilation system for a vehicle interior of the present invention.

FIG. 2 shows a partial plan view of a vehicle interior front portion, specifically showing intake vents 12 mounted on a sun visor 16, and placement of hinge 20 and exhaust hoses 14.

Figure 3:
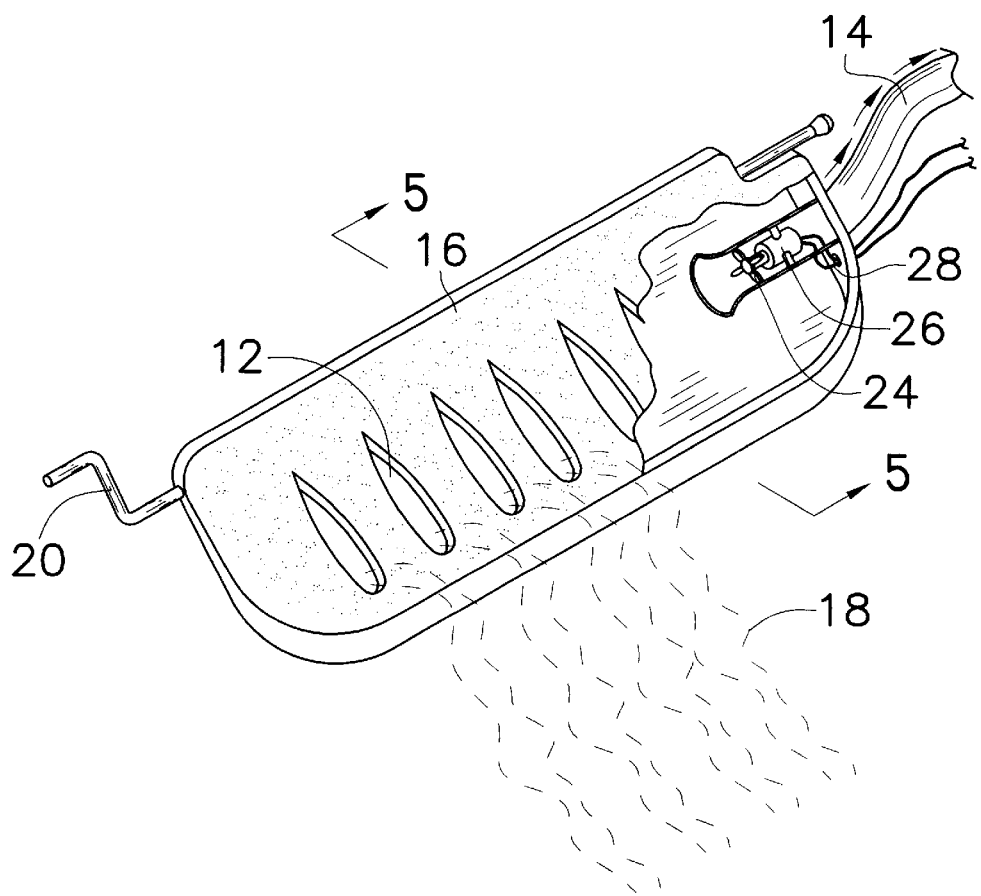
FIG. 3 is a partial cross sectional view of intake vents, fan, motor and electrical wiring of the ventilation system for a vehicle interior of the present invention.

FIG. 3 shows a partial cross sectional view of a sun visor 16 mounted by a hinge 20 on each side, with intake vents 12 which pull in smoke 18 or polluted air, lead it through exhaust hoses 14 and expel it outside a vehicle. FIG. 3 shows a cross section of an exhaust fan unit comprising a small fan 24 and motor 26 inside sun visor 16 powered by electrical wiring 28 which is connected to a vehicle's electrical system. The exhaust fan unit can also be mounted at the front of a vehicle interior above the windshield or at the rear roof of a vehicle interior above back windshield.

Figure 4:
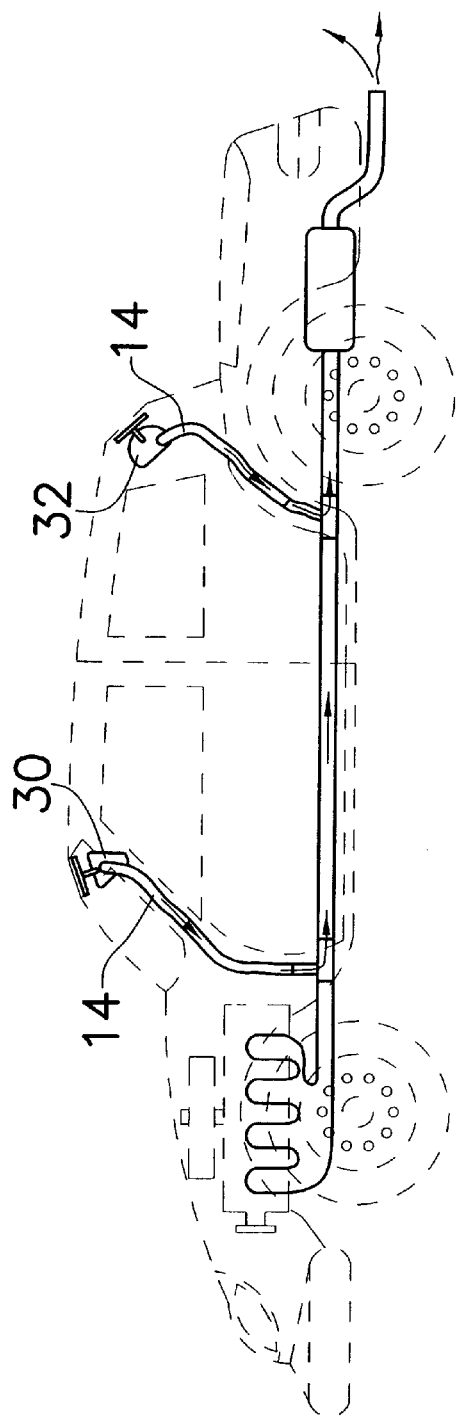
FIG. 4 is a sectional side view of the ventilation system for a vehicle interior of the present invention.

FIG. 4 shows a sectional side view of the present invention including a front intake 30 and a rear intake 32. Exhaust hoses 14 are shown leading outside a vehicle.

Figure 5:
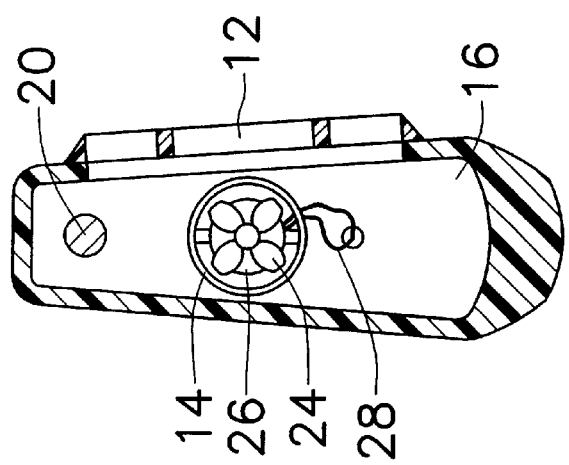
FIG. 5 is a plan sectional view of exhaust hoses, motor, fan and electrical wiring system of the ventilation system for a vehicle interior of the present invention.

FIG. 5 shows a plan sectional view of a ventilation system for a vehicle interior mounted on a sun visor 16 including a hinge 20, a fan 24, a motor 26, and electrical wiring 28.

In use, it can now be understood that a ventilation system for a vehicle interior can be mounted in various locations inside a vehicle interior to reduce or eliminate smoke and polluted air inside a vehicle.

While a preferred embodiment of the ventilation system for a vehicle interior has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, any suitable sturdy material such as a variety of metals or plastics may be used instead of the metal described. Also, the intake vents and fan may also be made of heavy-duty plastic or similar material. And although reducing or eliminating second-hand smoke from an interior of a vehicle have been described, it should be appreciated that the ventilation system for a vehicle interior herein described is also suitable for circulating air throughout an interior of a vehicle. Furthermore, a wide variety of mountings may be used instead of the sun visor described.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A ventilation system for a vehicle interior comprising:

exhaust fan units including a fan which is run by a motor powered by a vehicle's electrical system and operated by an on/off switch inside vehicle, the exhaust fan units are mounted to a sun visor held in place by a hinge inside vehicle; and air intake vents which take in air from a vehicle interior sending it through exhaust hoses which take air from a vehicle interior outside a vehicle.

2. The ventilation system for a vehicle interior of claim 1 wherein the exhaust fan units each comprise a small fan, air intake vents, and exhaust hoses.

3. The ventilation system for a vehicle interior of claim 2 further comprising a motor.

4. The ventilation system for a vehicle interior of claim 3 wherein the motor is wired to a vehicle's electrical system.

5. The ventilation system for a vehicle interior of claim 4 further comprising an on/off switch.

6. The ventilation system for a vehicle interior of claim 5 wherein the on/off switch is wired to the motor and operates the ventilation system.

7. A ventilation system for a vehicle interior comprising:

exhaust fan units including a fan which is powered by a battery system operated by an on/off switch inside vehicle; and air intake vents which take in air from a vehicle interior sending it through exhaust hoses which take air from a vehicle interior outside a vehicle, wherein said intake vents are mounted on sun visors held in place by hinges in front of a vehicle passenger compartment.

8. The ventilation system for a vehicle interior of claim 7 wherein the battery system is independent of the vehicle's electrical system.

9. The ventilation system for a vehicle interior of claim 8 wherein the battery system is attached directly to exhaust fan unit and located inside exhaust fan unit.

10. The ventilation system for a vehicle interior of claim 9 wherein exhaust fan unit is detachable or removable.

11. The ventilation system for a vehicle interior of claim 9 wherein exhaust fan unit is permanently affixed to a vehicle interior.

12. The ventilation system for a vehicle interior of claim 7 wherein rear intake vents are mounted along roof of vehicle interior at rear of passenger compartment above back window.

13. The ventilation system for a vehicle interior of claim 12 wherein the exhaust hoses expel smoke or polluted air outside a vehicle.

14. A method of removing smoke or polluted air from an interior of a vehicle and expelling it outside a vehicle including;

pulling smoke or polluted air from an interior of a vehicle with fans, which pull air through air intakes, said air intakes being mounted on a sun visor;

operating fans with motors attached to fans which are electrically wired to a vehicle electrical system;

expelling smoke or polluted air from an interior of a vehicle from air intakes through exhaust hoses, which lead outside a vehicle;

operating a ventilation system for a vehicle interior with an on/off switch; and wiring a ventilation system for a vehicle interior to a vehicle electrical system.

* * * * *